J. Dubois.
Ship Dock.
No. 81,075. Patented Aug. 18, 1868.
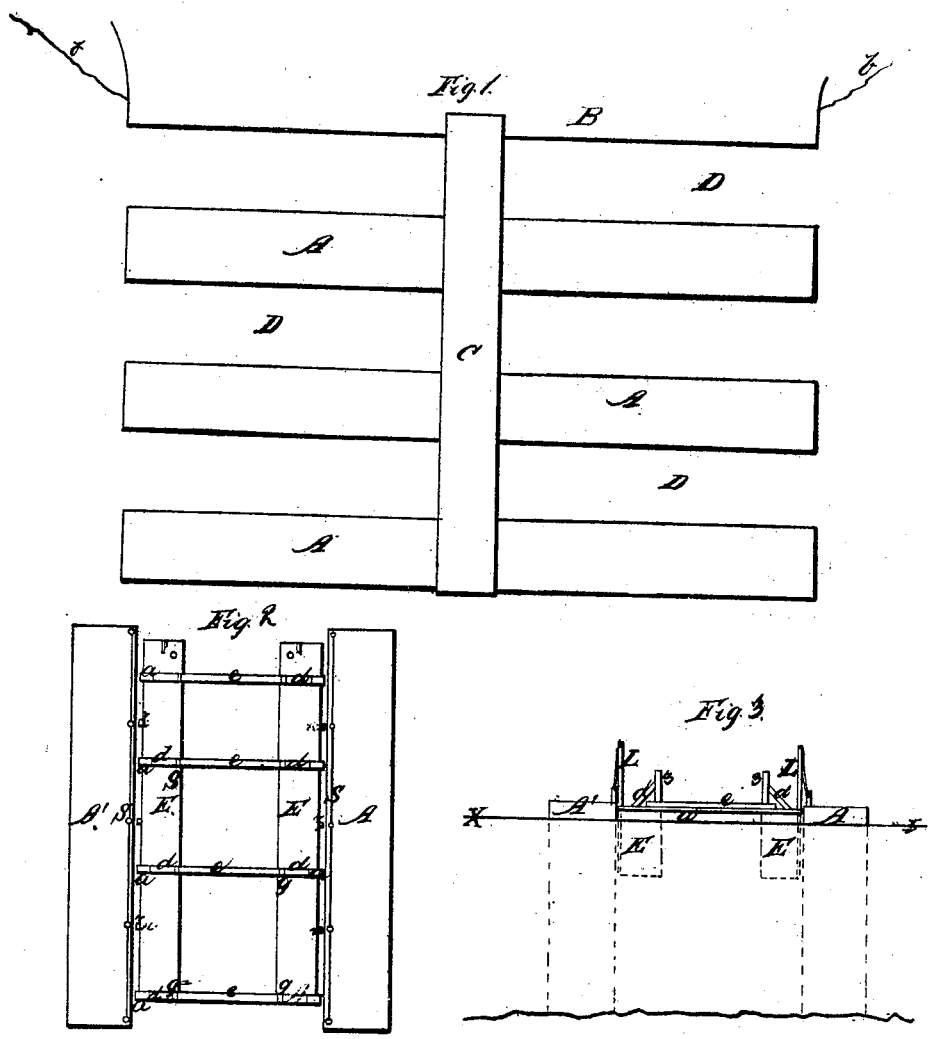
Witnesses
J. B. Woodruff
Geo. C. Green
Inventor,
John Du Bois

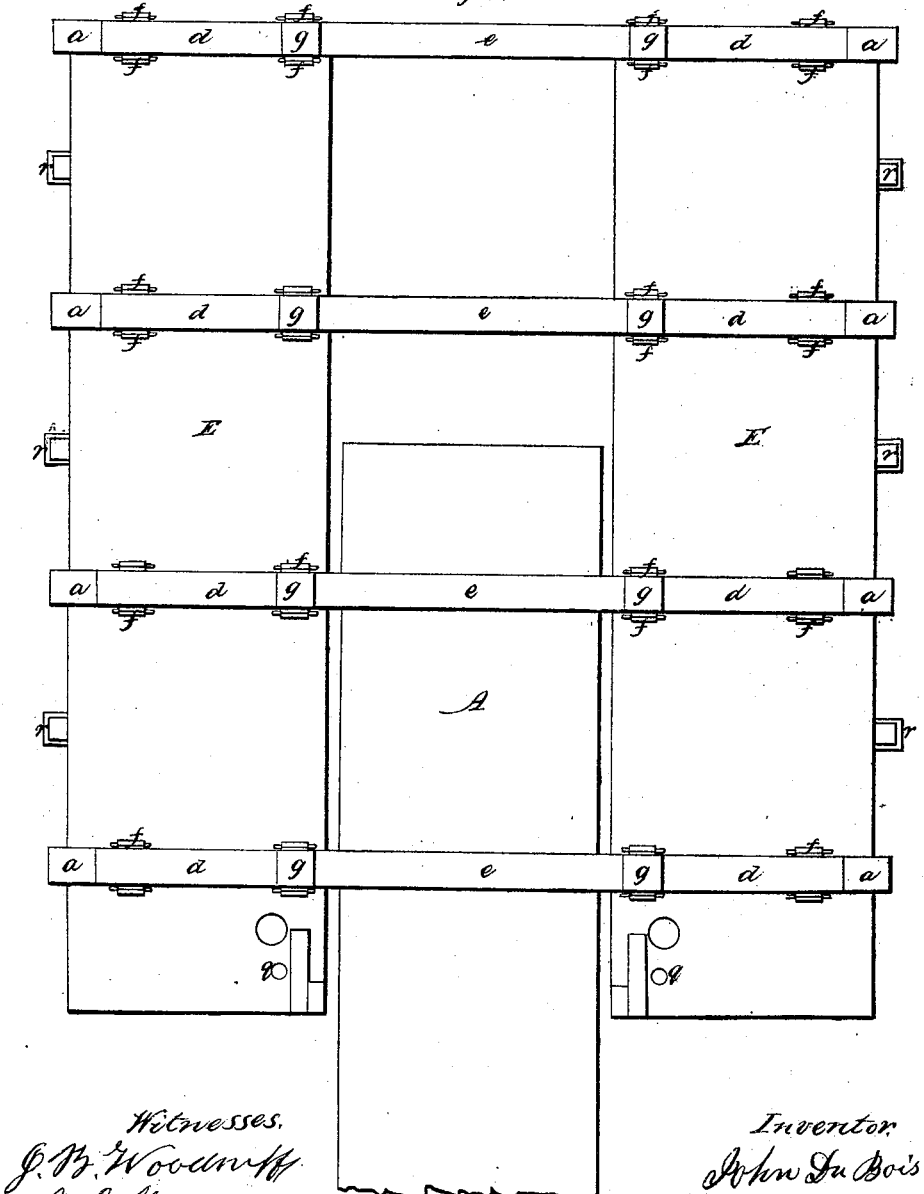

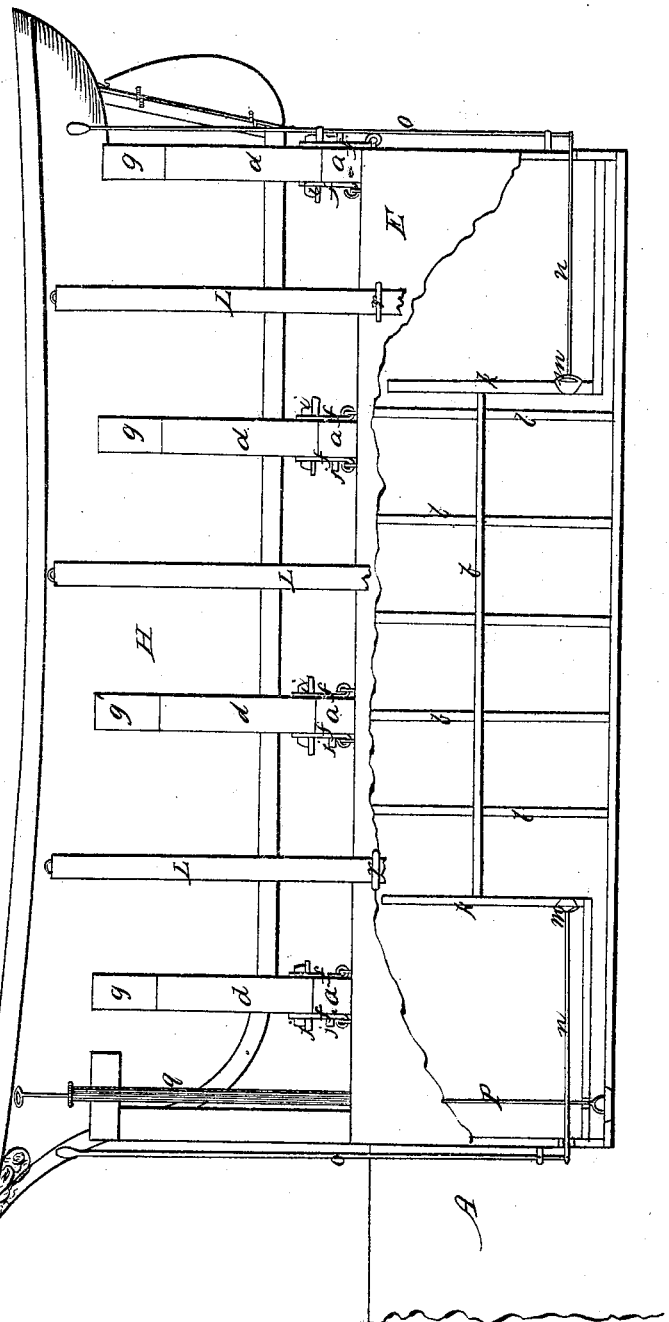

Sheet 4, 5 Sheets.
J. Dubois.
Ship Dock.
N° 81,075.      Patented Aug. 18, 1868.
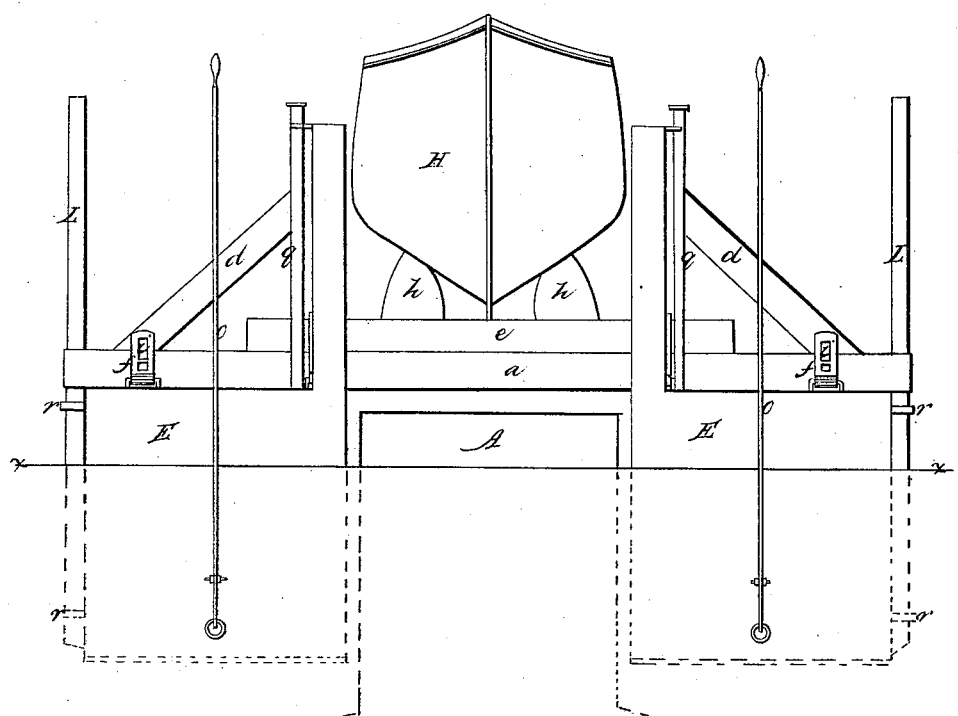
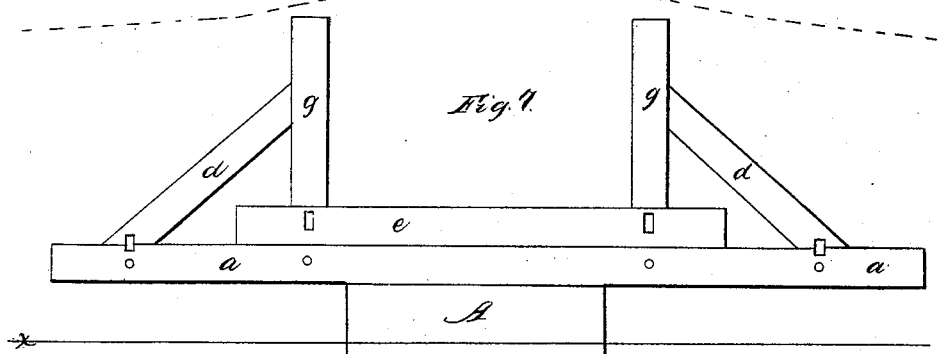
Witnesses.
J. B. Woodruff
Geo. Green
Inventor.
John DuBois

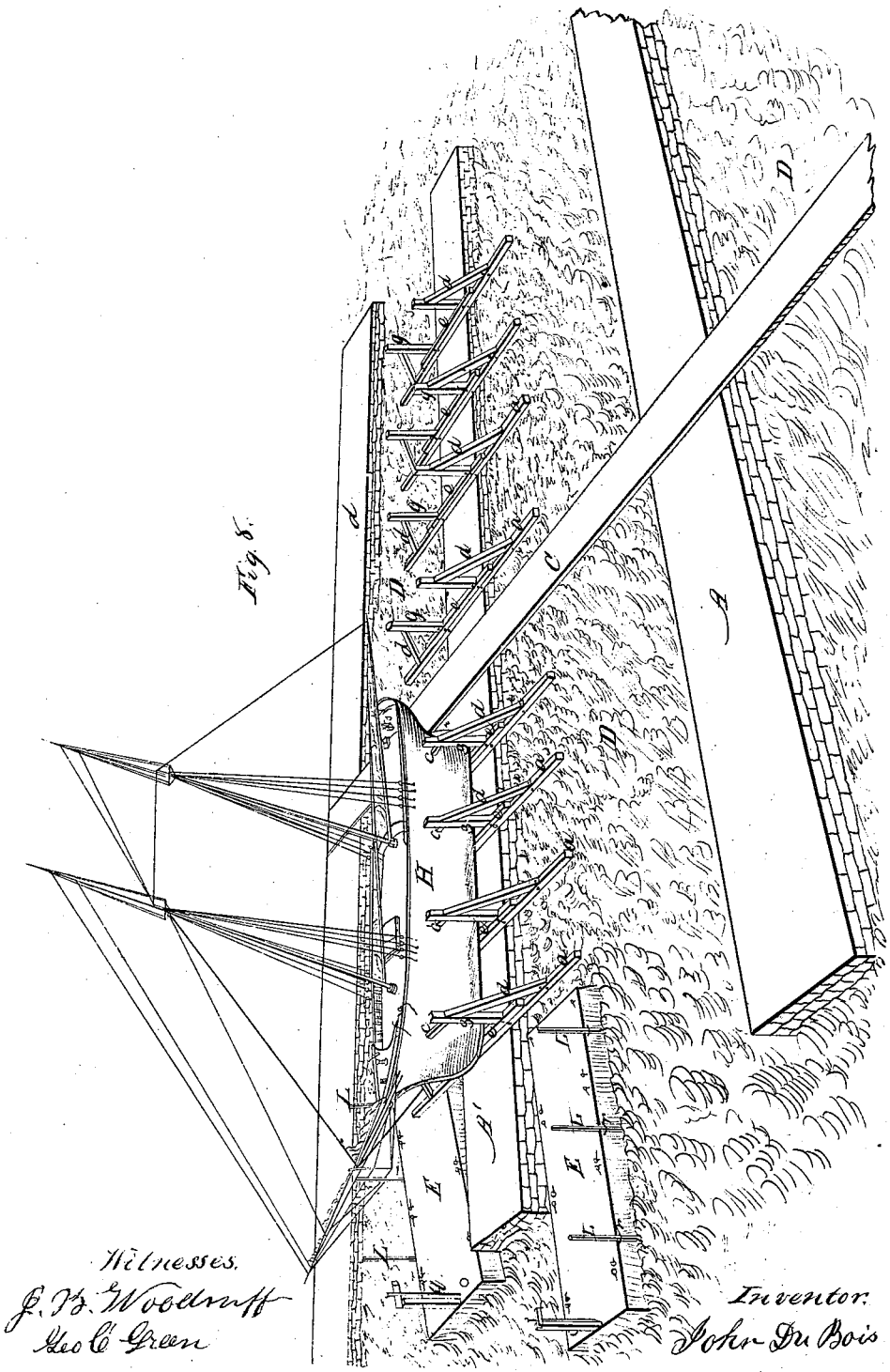

United States Patent Office.

JOHN DU BOIS, OF WILLIAMSPORT, PENNSYLVANIA.

Letters Patent No. 81,075, dated August 18, 1868.

---

IMPROVED DEVICE FOR MOVING VESSELS TO AND FROM WHARVES OR DOCKS TO WATER.

---

*The Schedule referred to in these Letters Patent and making part of the same.*

---

TO ALL WHOM IT MAY CONCERN:

Be it known that I, JOHN DU BOIS, of Williamsport, in the county of Lycoming, in the State of Pennsylvania, have invented certain new and useful Improvements in the Mode for Building a Ship-Yard, with the necessary appendages for launching vessels and other craft when finished, and also for taking vessels and other craft out of the water, and placing them in and on said yard for repairs or other purposes; and the following is a full, clear, and exact description of the same, reference being had to the drawings accompanying this specification, and forming a part of the same, in which—

Figure 1, Plate I, represents a top view of the wharves, docks, and bridge on which vessels are to be built and repaired.

Figure 2 represents a top view of the lighters floating in the dock, with the framework for sustaining the vessel firmly secured thereon, preparatory for sinking, to receive the vessel on said frame; also the two wharves forming the dock, for the purpose of forcing the lighters, with the framework thereon, a sufficient depth below the surface of the water to allow the vessel to float over and into the framework, preparatory for raising it out of the water and transferring it on to the wharf.

Figure 3 shows an end view of fig. 2.

Figure 4, Plate II, is an enlarged top view of the lighters, with the framework secured thereon, partially lying in the docks and over the wharf.

Figure 5, Plate III, shows a side view of the lighters and framework, with a vessel thereon elevated above the water.

Figure 6, Plate IV, is an end view of the lighters and framework, with a vessel thereon elevated above the wharf, ready to be lowered on the same.

Figure 7 is an end view of the frame, setting on the wharf.

Figure 8, Plate V, represents a perspective view of a vessel in the frame on the wharf; also another frame on, and the lighters being moved away from the wharf.

The object of my invention is to construct a ship-yard, for building and repairing vessels and other craft, which will afford a greater capacity, at a less cost and risk, than any of the present modes in use.

In building and launching vessels, the common mode, in most cases, is to frame and finish them upon an inclined plane of sufficient grade to slide them into the water, when the ways are thoroughly lubricated, thereby subjecting them to great risk and inconvenience; and for taking vessels out of the water for repairs, &c., two methods have been in practice—one, by the use of the inclined plane, or marine railway, and the other by the dry-dock. The use of either affords but little capacity for the money invested. As the vessel upon the dry-dock occupies it until it is entirely repaired and set back into the water, and the railway, if of sufficient length to receive two vessels on at a time, the one put on last must be the first to come off, while, by my invention, one set of lighters may be used to accommodate as many vessels as there are wharves and frames to set them on, while no one is in the way of another, while any one may be approached, taken off, and set in the water at pleasure, or any one taken out of the water and set upon the docks at will, with comparatively small cost and with no risk.

To enable others to construct my improved ship-yards, and the necessary appendages for launching vessels, and taking them and other craft out of the water for repairs, &c., I will describe it more fully, referring to the drawings, and to the letters of reference marked thereon.

A A A A show a series of piers built out in the harbor, parallel with each other, and the wharf, B, on the shore b b, leaving channels or docks D D D between them, of sufficient width to allow my improved lighters, E E, with the frames a a and e e, the ends being secured to them, to pass in the dock two lighters abreast, so that any or all of the piers or wharves can be occupied by the frames a a, e e on vessels at one and the same time, as seen in fig. 8, on Plate V.

The piers A A A may be built in any of the ordinary modes of construction, and of any desired length; also, any number of them may be extended out into the harbor, and they may be connected together by a bridge, C, extending from the shore-wharf, B.

The series of frames upon which a vessel or other craft is built, or on which a vessel is supported when raised out of the water for repairs, is constructed in the following manner:

Heavy square timbers, $a\ a\ a$, of sufficient length to reach across the wharf A, extend out both sides as far as the width of the floats or lighters E E. On the top of the long, heavy, square timbers $a\ a$, are placed other timbers, $e\ e\ e$, of the same size, which extend out over the lighters E E about one-third of the width of them. Upon the top timbers $e\ e$ are erected heavy posts, $g\ g$, they being a sufficient distance apart to admit the hull of a ship, H, to pass in between them, and there be supported by blocks, $h\ h$, and keys or props $c\ c\ c$, against the posts $g\ g$, which are firmly secured and supported on the outside by heavy braces $d\ d\ d$. The frames being placed on the floats E E, they are firmly secured to them by heavy metal hinged straps, $f\ f\ f\ f$, which are fastened to the floats E E at such places that when the timbers $a\ a$ are placed in their proper position on the floats, the straps $f\ f$ are brought up against each side of the timbers, and firmly fastened by driving in the keys $i\ i\ i\ i$ and putting in the bolts $j\ j\ j$, as shown more distinctly in fig. 5, Plate III.

My improved mode of constructing lighters for the purposes above specified—the internal arrangement—is shown in the broken-away side sectional view of fig. 5, Plate III.

The floats or lighters E E, in their external form, are a long, square-cornered box, of the required width to correspond with the timbers $a\ a$, which extend out from the width of the wharf A on both sides. The depth may be such as to give them the sufficient capacity of buoyancy required to raise the ship and the frame of timbers, to hold it in an upright position above the top of the pier, and float them over, so that they may be lowered down and rest firmly on the pier.

The top, bottom, and sides of the lighters are supported by a strong framework of timbers, $l\ l\ l\ l$, with three or more compartments, by putting in bulk-heads $k\ k$ at about one-fourth of the distance from each end, they being provided with cone-valves $m\ m$, connected to rods $n\ n$, so as to be operated for opening by levers $o\ o$, extending up at each end of the float.

The object of the water-tight compartments at both ends of the lighters is to balance the weight of the ship or other craft on them, by letting in a sufficient quantity of water at either end or compartment to effect the purpose, the lighters being also provided with pumps, P P, for discharging them, and likewise with air-tubes, $q\ q$, for the escape of air while they are being filled with water in sinking, and to counteract the buoyancy of the wood and timber.

I have provided the floats E E with a series of staples, $r\ r\ r\ r$, in which vertical timbers, L L L, may be placed, which extend up a sufficient height, and are connected with a windlass, or other suitable power-machinery attached to the wharves A A, on each side, as to enable them to be forced down with all of the frame-timbers, so as to let the vessel float over them, when it is secured for raising out of the water.

The devices for sinking the lighters E E, above referred to, are shown more particularly in the figs. 2 and 3, on Plate I, where the lighters or floats E E, with the frames $e\ e\ e$ secured to them, are lying in between two piers or wharves, A′ A′, the timbers being above the water-surface X X, about on a level with the top of the piers, the vertical timbers L L L being placed in the staples $r\ r\ r$, and extending up above the piers, with ropes or chains fastened to their tops, which are attached to windlasses $s\ s$, on the edge of the piers A′ A′, or other power-machinery, sufficient to force them deep enough below the surface to float a vessel on to them when they are let loose, and permitted to rise with the vessel, the water pumped out, until the frames $a\ a\ a$, with the vessel on them, will float over one of the piers A, when the lighters are unloosed and removed from under, leaving the vessel on the stocks high and dry, as seen in fig. 8, when the extended portions of the frames may be planked over, making the floor of the ship-yard,

What I claim as my invention, and desire to secure by Letters Patent, is—

The floats E E, constructed and arranged as herein described, in combination with the transversible, detachable, and adjustable framework $a\ e\ d\ g$, in the manner and for the purpose herein set forth.

In testimony whereof, I hereunto subscribe my name in the presence of—

JOHN DU BOIS.

Witnesses:
J. B. WOODRUFF,
GEO. C. GREEN.